Figure 1:
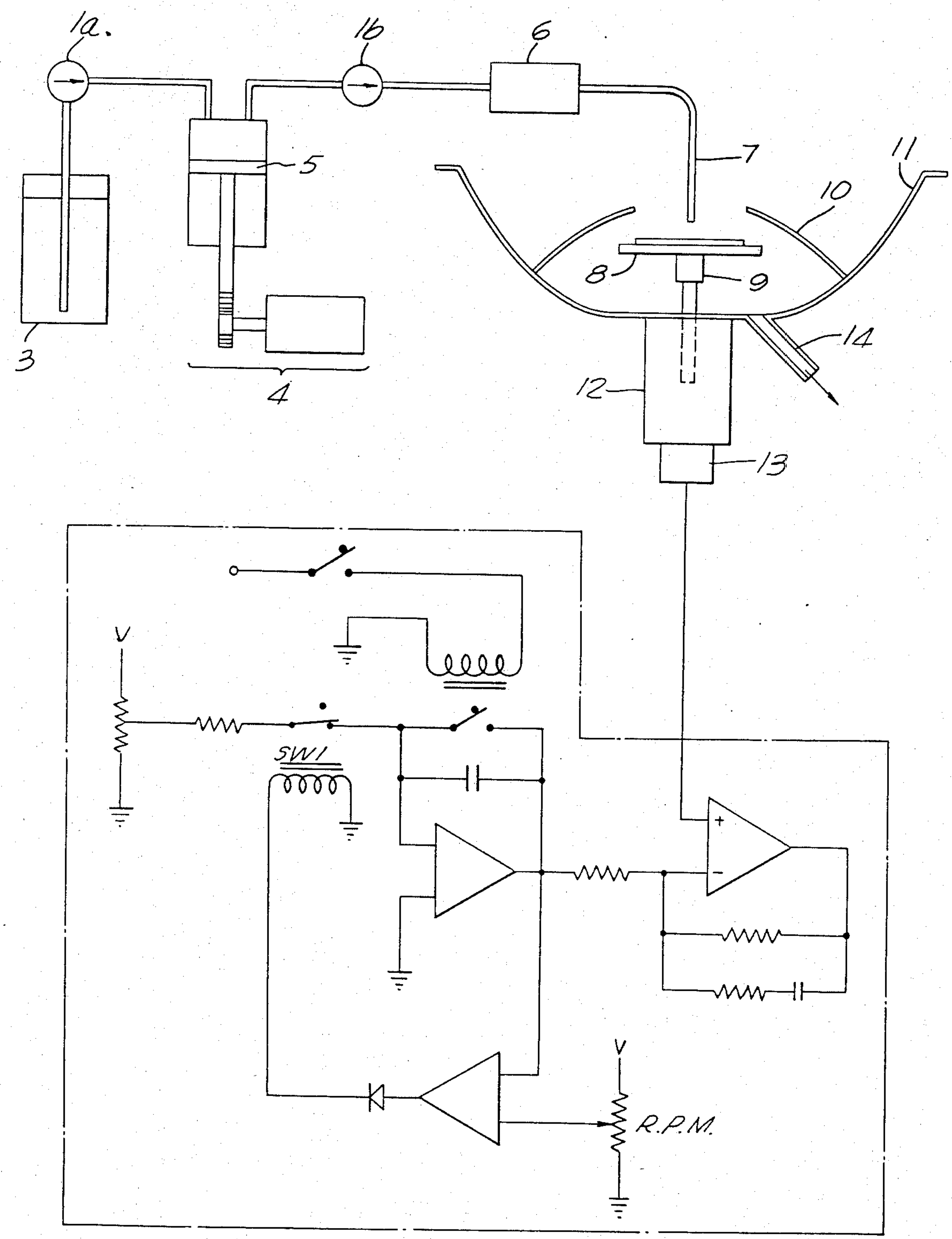

United States Patent [19]

Winn

[11] Patent Number: 4,536,240

[45] Date of Patent: Aug. 20, 1985

[54] METHOD OF FORMING THIN OPTICAL MEMBRANES

[75] Inventor: Ray Winn, Studio City, Calif.

[73] Assignee: Advanced Semiconductor Products, Inc., Santa Cruz, Calif.

[21] Appl. No.: 468,468

[22] Filed: Feb. 22, 1983

Related U.S. Application Data

[62] Division of Ser. No. 326,489, Dec. 2, 1981, Pat. No. 4,378,953.

[51] Int. Cl.[3] .............................................. B29D 7/02

[52] U.S. Cl. ...................................... 156/74; 156/241; 156/246; 264/1.7; 264/2.1; 264/311

[58] Field of Search ................. 264/2.1, 310, 311, 1.7; 156/74, 230, 241, 246

[56] References Cited

U.S. PATENT DOCUMENTS

Re. 27,617 4/1973 Olsen .
1,578,283 3/1926 Hammer .
1,791,711 2/1931 Burwell .
2,087,008 7/1937 Snyder et al. .
2,114,491 4/1938 Hollabough et al. .
2,191,896 2/1940 Melgs et al. .
2,347,938 5/1944 Dimmick .
2,385,486 9/1945 Bartoe et al. .
2,412,470 12/1946 Norton et al. .
2,463,093 3/1949 Felder .
2,468,232 4/1949 Prichard et al. .
2,507,200 5/1951 Elliett et al. ........................ 117/121
2,570,273 10/1951 Pryor .
2,578,282 12/1951 Bliss .
2,616,816 11/1952 De Gier et al. .
2,658,843 11/1953 Brillhart et al. .
2,689,187 9/1954 Thomsen et al. .
2,890,621 6/1959 Suits .
2,897,544 8/1959 Marks .
2,897,544 8/1959 Elliott et al. .
2,907,672 10/1959 Irland et al. ....................... 117/33.3
2,930,717 3/1960 Dunn et al. .
3,038,814 6/1962 Cipriani et al. .
3,129,099 4/1964 Consaul et al. .
3,129,099 4/1964 Consaul et al. .
3,188,224 6/1965 Matalon et al. .

(List continued on next page.)

FOREIGN PATENT DOCUMENTS 1183233 12/1964 Fed. Rep. of Germany .
1234027 2/1967 Fed. Rep. of Germany .
2326314 12/1974 Fed. Rep. of Germany .
2448294 4/1976 Fed. Rep. of Germany .
2815704 10/1979 Fed. Rep. of Germany .
3038468 6/1981 Fed. Rep. of Germany .
3036615 5/1982 Fed. Rep. of Germany .
3045519 6/1982 Fed. Rep. of Germany .
54-119557 9/1979 Japan .
1089358 11/1967 United Kingdom .

OTHER PUBLICATIONS

An Investigation of Spin Coating of Electron Resisto", Lai, *Polymer Engineering and Science,* Nov. 79, vol. 19, No. 15, pp. 1117–1121.

"Measurement of the Thickness of Transparent Plates", Instruments and Experimental Techniques, vol. 21, No. 3/2, 5-6-78, pp. 811-812.

(List continued on next page.)

*Primary Examiner*—James Lowe
*Attorney, Agent, or Firm*—Kendrick, Netter & Bennett

[57] ABSTRACT

Edge-supported and fully supported membranes having substantially uniform thickness, and substantially parallel surfaces, and having the capacity to transmit at least about 90% of incident light with very little diffraction, dispersion or absorption of incident light are made by forming a polymer/solvent mixture, spin-coating a film of the polymer from the mixture onto a rotatable surface, which may have a release agent thereon, and, where a release agent is present, joining a frame or other support to the membrane and removing the membrane with its attached support from the surface. Apparatus for making such membranes includes a dispenser for dispensing a polymer/solvent mixture onto a rotatable support; a device for spinning the rotatable support at gradually increasing speeds from a first to a second speed; and a device for maintaining the speed of rotation of the support at the second speed until the membrane forms.

33 Claims, 1 Drawing Figure

U.S. PATENT DOCUMENTS

| | | | |
|---|---|---|---|
| 3,202,070 | 8/1965 | Pratt, Jr. et al. . | |
| 3,202,071 | 8/1965 | Carlson . | |
| 3,265,763 | 8/1966 | Deichert et al. . | |
| 3,278,860 | 10/1966 | Winn . | |
| 3,397,613 | 8/1968 | Kallenberg . | |
| 3,438,694 | 4/1969 | Reid et al. | 350/171 |
| 3,495,512 | 2/1970 | Vaughan . | |
| 3,498,711 | 3/1970 | Ables et al. . | |
| 3,507,592 | 4/1970 | McLaughlin . | |
| 3,507,592 | 4/1970 | McLoughlin . | |
| 3,519,348 | 7/1970 | McLaughlin . | |
| 3,569,718 | 3/1971 | Börner . | |
| 3,573,456 | 4/1971 | Beek . | |
| 3,573,456 | 4/1971 | Beek . | |
| 3,584,948 | 6/1971 | Herriott . | |
| 3,584,948 | 6/1971 | Herriott . | |
| 3,598,490 | 8/1971 | Yearsley . | |
| 3,610,750 | 10/1971 | Lewis et al. . | |
| 3,612,692 | 10/1971 | Kruppa | 356/108 |
| 3,617,125 | 11/1971 | Sobottke et al. . | |
| 3,642,507 | 2/1972 | Olhoft et al. . | |
| 3,644,134 | 2/1972 | Widmann et al. . | |
| 3,660,545 | 5/1972 | Wichterle | 264/2.1 |
| 3,673,055 | 6/1972 | Sheld . | |
| 3,674,488 | 7/1972 | Dodd, Jr. et al. . | |
| 3,676,002 | 7/1972 | Moran et al. . | |
| 3,695,911 | 10/1972 | Polin | 264/311 |
| 3,718,396 | 2/1973 | Hennings . | |
| 3,729,316 | 4/1973 | Castrucci et al. . | |
| 3,743,417 | 7/1973 | Smatlak . | |
| 3,744,904 | 7/1973 | Loprest | 355/125 |
| 3,769,895 | 11/1973 | Lucas . | |
| 3,775,614 | 11/1973 | Winn et al. . | |
| 3,776,633 | 12/1973 | Frosch et al. . | |
| 3,781,251 | 12/1973 | Herms et al. . | |
| 3,811,753 | 5/1974 | Onoki et al. | 350/175 NG |
| 3,815,978 | 6/1974 | Marinaci . | |
| 3,824,014 | 7/1974 | Abita . | |
| 3,824,014 | 7/1974 | Abita . | |
| 3,836,961 | 9/1974 | Ennis et al. . | |
| 3,844,655 | 11/1971 | Johannsmeler . | |
| 3,867,153 | 2/1975 | MacLachian . | |
| 3,892,973 | 7/1975 | Coquin et al. . | |
| 3,907,580 | 9/1975 | Van Ham . | |
| 3,934,081 | 1/1976 | Schumacher . | |
| 3,937,579 | 2/1976 | Schmidt . | |
| 3,943,531 | 3/1976 | O'Reilly et al. . | |
| 3,953,115 | 4/1976 | French et al. . | |
| 3,966,483 | 6/1976 | Albright . | |
| 3,986,876 | 10/1976 | Abita . | |
| 4,027,719 | 6/1977 | Strempel . | |
| 4,029,726 | 6/1977 | Nichols . | |
| 4,063,812 | 12/1977 | Abraham . | |
| 4,068,019 | 1/1978 | Boeckl . | |
| 4,094,695 | 6/1978 | Sanders . | |
| 4,105,289 | 8/1978 | Hershel . | |
| 4,131,363 | 12/1978 | Shea et al. | 355/75 |
| 4,147,429 | 4/1979 | Liple . | |
| 4,182,723 | 1/1980 | Covington . | |
| 4,182,723 | 1/1980 | Covington . | |
| 4,209,250 | 6/1980 | James et al. . | |
| 4,213,698 | 7/1980 | Firtion et al. . | |
| 4,213,698 | 7/1980 | Firtion . | |
| 4,231,657 | 11/1980 | Iwamatsu . | |
| 4,254,174 | 3/1981 | Flanders et al. . | |
| 4,256,969 | 6/1981 | Lianza . | |
| 4,267,212 | 5/1981 | Sakawaki . | |
| 4,274,933 | 6/1981 | Kamada et al. . | |
| 4,283,363 | 8/1981 | Boudenant et al. . | |
| 4,283,363 | 8/1981 | Boudenant et al. . | |
| 4,314,759 | 2/1982 | Webersik . | |
| 4,378,953 | 4/1983 | Winn | 350/171 |

OTHER PUBLICATIONS

"Striation-Free Resist Coating Prouff", Mandou et al., *IBM Technical Disclosure Bulletin,* vol. 18, No. 2, Jul. 1975, pp. 391–392.

"The Design of Optical Systems", by Warren J. Smith, Modern Optical Engineering, 1966, pp. 169–170.

"Photoresist Undulation Control", White, *IBM Technical Disclosure Bulletin", vol. 18, No. 5, Oct. 1975, p. 1320.*

N.P.C. Pellicle Coatings & Curres, National Photocolor Corp., 3/3/70.

"Thin Polymer Films for Transmission Infrared Spectroscopy," by Jurfey T. Koberstein and Stuart L. Cooper, Rev. Sci. Instrum, vol 46, No. 12, Dec. 1975.

"Parylene Pellicles", Union Carbide Corp., N.Y. Business Development Dept., 8/1971.

"Free-Standing Photoresist Films for Microlithography," by J. W. Little, T. A. Cellot and E. T. Aiakawa, Rev. Sci. Instrum, 51 (11), Nov. 1980.

"Preparation of Thin Coating Films of Uniform Thickness by a Centrifugal Method", Chem. Abst., vol. 78, No. 13, 4/2/73, p. 95.

IBM Technical Discl. Bul., vol. 18, No. 10, Mar. 1976.

"Dye Laser Turning with Pellicles", by P. B. Mumda, Journal of Applied Physics, vol. 44, No. 7, 7/1973, pp. 3198–3199.

IBM Technical Discl. Bul., vol. 15, No. 10, Mar. 1973.

"Principles of Optics", Born et al., Pergamon, 1959, p. 16.

IBM Technical Discl. Bul., vol. 17, No. 8, Jan. 1975.

"A Laser Interference Thickness Gage", Measurement Techniques, Bukreev et al., vol. 18, No. 6, pp. 821–823, 6/1975.

Microelectronics News, Apr. 9, 1983.

Union Carbide Technology Letter re Parylene, New Business Dept., Jan. 1974.

IBM Technical Discl. Bul., vol. 14, No. 1, Jun. 1971.

"Parylene Thin Films for Radiation Applications", by M. Spivack, The Review of Scientific Instruments, 11/1970.

Advanced Semiconductor Products News Release, Apr. 10, 1983.

Prices & Ordering of NPC Pellicles, National Photocolor Corp., 4/1981.

Electro-Optical Systems Design, Aug. 1970.

"Pellicle Protection of Integrated Circuit Masks", by Ronald S. Hershel, *SPIE,* vol. 275, Semiconductor Micro Lithography Vi (1981).

Electro-Optical Systems Design 870, Aug. 1970.

"Optimization of Photoresist Processing with the IBM 7840 Film Thickness Analyzer", by Hans H. Denk, IBM Corp., 1976.

The Implementation of Pellicle Mask Protection System into an Established Production Area-Lent & Scrayne.

"Optical Interference Coatings Prepared from Solution", by Roger G. Phillips & Jerry W. Doods, Applied Optics, vol. 20, No. 1.

Union Carbide The Discovery Co.-Paryline Pellicles, Jul. 1973.

"Preparation of Films for Test", by Charles Grenko, Films for Testing, Chapter 4.1, pp. 251–259.

Technique for Inspecting Photomasks with Pellicles Attached.

"The Influence of Striations in AZ1850 H, Phototest Films on the Generation of Small Geometrics", by H. Binder, et al., Communications VI. 4.

OTHER PUBLICATIONS

Deposition Systems–Section 6.

"Tensile Strength & Elongation", by G. G. Shurv, Chapt. 5.5.

Chemical Abstracts–vol. 78, No. 14, Apr. 9, 1973.

Solving Design Problems with Pellicles, Electro Optical Systems Design, National Photocolor Corporation.

Sir Isaac Pitman & Sons–Plates, Films Negative Papers and Speed Ratings–1954.

"Pellicles–An Industry Overview", Technology Topics.

Electron Microscopy–Interscience Publishers–1949.

Beam Splitting with NPC Pellicles, National Photocolor Corporation.

IR Theory and Practice of Infrared Spectroscopy, Alpert et al., Plenum Press.

"Parylene Pellicles/Parylene Coatings", Union Carbide Corp., Aug. 1971.

Electron Microscopy Proceedings–Electrotechnical Laboratory, 1956.

"On the Uniformity of Thin Films: A New Technique Applied to Polyimides", Givens et al., *J. Electrochemical Society: Solid State Science & Technology,* Feb. 79, vol. 126, No. 2, pp. 269–272.

"Polyimide Substrates for X-Ray Lithography", Feder et al., *IBM Technical Disclosure Bulletin,* vol. 20, No. 11B, Apr. 78, pp. 4953–4955.

METHOD OF FORMING THIN OPTICAL MEMBRANES

This is a division, of application Ser. No. 326,489 filed Dec. 2, 1981 now U.S. Pat. No. 4,378,953.

This invention relates to thin, optical membranes and to methods and apparatus for making such membranes.

The thin, optical membranes of this invention have substantially uniform optical thickness. Specifically, they can have a nominal optical thickness in the range of about 0.5 to about 10 micrometers. The opposite surfaces of these membranes are nearly parallel to one another. Unit-to-unit variations in nominal thickness can be limited to less than about 2%, and preferably less than about 1%. In any one membrane, variations in nominal thickness from edge to edge of the membrane can be limited to less than about 2%, and preferably less than about 1%.

These membranes are highly light-transmissive. Specifically, these membranes transmit in the range of about 84% to about 99% of incident light and can be made to transmit at least about 96%, 98% or even 99% of incident light at one or more predetermined wavelengths of light in the range of about 260 to about 1,000 nanometers. Yet, these membranes can be made to shift the focus of incident light in an optical path less than about a third of the membrane's thickness. Because the membranes are highly light-transmissive, they absorb, diffract and disperse less than about 3% of incident light, and can be made to absorb, diffract and disperse less than about 1% of incident light at one or more specific wavelengths in the range of about 260 to about 1,000 namometers (nm).

These new membranes have many uses. In particular, they are useful as optically transmissive shields for reticles in projectors such as the Perkin-Elmer 200 series projectors. Placing these new films over photomasks, for example, protects the masks from airborne particulates and other forms of contamination. These membranes are available commercially from Advanced Semiconductor Products under the tradenames Broadband Photomask Pellicle Type BB-2.85 and Low Reflectance Monochromatic Pellicle Type LR-1.

The Type BB-2.85 pellicle is made of nitrocellulose, and has a thickness of 2.85 micrometers. Thickness variations in a single pellicle sample are less than about 0.06 microns. The Type BB-2.85 pellicle transmits 94% of incident light, on average, where the incident light is in the range of about 350 to about 450 nanometers. This pellicle absorbs and diffracts less than about 0.3% of incident light in total where the incident light is in the range of about 350 to about 450 nanometers, and shifts the focus of incident light in an optical path less than about one micron. This pellicle typically has an outside diameter of 76.2 millimeters, and an inside diameter of 72.4 millimeters. The pellicle can withstand 40 psi of air pressure from a hose having a 0.5 micrometer filter, and a 0.125 inch exit orifice provided the orifice is held at least four inches from the pellicle. The BB-2.85 pellicle is especially useful as a photomask particulate protection system for 1:1 projection aligners using high-pressure, memory arc lamps.

The Type LR-1 pellicles are also made of nitrocellulose, and have a thickness of 0.723 plus or minus 0.01 micrometers. Minimum light transmission is about 98% at 436 nanometers and 540 nanometers; 96%, at about 365 namometers. Incident light reflectance from these pellicles is typically about 2% at 436 and 546 nanometers and about 3% at 365 nanometers. Less than about 0.25% of the incident light is diffracted or absorbed, in total, where the incident light has a wavelength of about 436 or about 546 nanometers, and is less than about 1% in total at 365 namometers. The Type LR-1 pellicle is strong. It will withstand 30 psi air pressure from 3-M's Model 902F airgun, provided the exit orifice is held at least four inches from the pellicle. The LR-1 shifts the focus of incident light in an optical path less than about one micron, making the LR-1 especially useful for a 10:1 direct wafer stepper such as the GCA stepper.

The new membranes are also useful as partial optical beam splitters; low-reflectance optical windows for monochromatic optical systems; partial light polarizers; acoustically-sensitive films; high-transmission windows for nuclear radiation detectors; and as anti-reflective coatings on reflective substrates having a higher index of refraction than these membranes such as bright chrome surfaces.

These membranes can be edge-supported or can be coplanar with a fully or partially-supporting surface such as a photomask, optical flat, mirror or other rigid or flexible surface.

Apparatus and methods for measuring accurately the optical thickness and index of refraction of these membranes are disclosed in the copending U.S. patent application Ser. No. 326,488, filed Dec. 2, 1981, now U.S. Pat. No. 4,378,953 of Ray Winn and Ronald S. Hershel, entitled, "Apparatus and Methods for Measuring the Optical Thickness and Index of Refraction of Thin, Optical Membranes,". By reference we incorporate in this application the entire disclosure of that application.

The method of making our new membranes includes forming a polymer/solvent mixture, and then spin-coating a film of the polymer from the mixture onto a rotatable surface. This surface can form a coplanar support for the membrane, especially where the surface carries no parting or release agent. Where the membrane has been formed on a surface that has a release or parting agent thereon, the membrane can be joined to other support means. With the other support means joined to the membrane, the membrane can then be removed from the surface on which it was formed. For example, after a membrane has been formed on a rotatable surface having a release agent thereon, a closed perimeter ring or frame can be cemented to the membrane. After the cement cures or dries, the ring or frame can be separated from the support surface, carrying with it the membranes bonded to the ring or frame. Alternatively the membrane can be removed from its support surface by air jets, liquid jets or other detachment means. Such membranes may then be attached to a separate ring, frame or other membrane support.

In one embodiment of our method, we dispense a polymer/solvent mixture onto a rotatable supporting surface that has a release or parting agent thereon, and then spin the surfce at increasing rates of rotation until we reach a predetermined speed of rotation. Once we reach the predetermined speed of rotation, we continue to spin the rotatable surface until the membrane forms at the desired thickness and diameter. Typically, we spin the rotatable surface for a time in the range of about 3 to about 60 seconds, and at a temperature in a range of about 20° C. to about 30° C. Membrane thickness and diameter depends primarily upon the viscosities of polymer and solvent, the rate of acceleration and speed of the rotatable support on which we form the membrane, and the final speed of rotation.

As the membrane forms, solvent escapes from the polymer, and the polymer becomes more viscous, particularly near the outer edges of the forming membrane. The polymer/solvent mixture flowing toward the edges of the rotating support surface encounters higher radial acceleration in proportion to the distance from the center of rotation. Moreover, as the rotational speed of the supporting surface increases, higher radial forces are imposed on the polymer. Above the rotating support surface, we introduce a mass of solvent-rich air to reduce the rate of solvent evaporation. Variations in membrane thickness can be controlled by adjusting the rate of evaporation and the kind and quantity of thermal treatment, if any, that the membrane undergoes after formation.

To remove the finished membrane from the rotatable support surface, and, in particular, to form an edge-supported membrane therefrom, we apply cement or other bonding agent to the surface of a lapped frame. Alternatively, we can apply cement to the film itself through a stencil of appropriate shape. The frame and membrane are then joined to one another, and the cement is permitted to set and dry.

A suitable cement consists of a mixture of one-part, five-minute epoxy resin; one-part, five minute epoxy hardener; and two-parts, 3-pentanone, which dilutes the epoxy and extends its pot life from a nominal three minutes to a nominal 30 minutes. After application of the epoxy/solvent mixture to the frame, the solvent evaporates quickly, causing the epoxy to cure and bond to the film.

After bonding of membrane to frame is complete, the membrane can be cut along the outside perimeter of the frame with a suitable tool, and the frame with attached membrane can then be separated from the support surface. Because of the radial stresses imposed on the membrane during spinning, and because of the reduction in volume of the membrane following evaporation of its solvent, the membrane will be taut, and will have substantially uniform tension.

The thin, optical membranes of our invention are preferably made from one or more polymers such as acrylics and nitrocellulose. In one embodiment or our invention, we dissolve nitrocellulose in a solvent such as alcohol. We could also use such solvents as ketones and polyglycols such as 1,2-dimethoxyethane. Preferably, our polymer/solvent mixture also includes a leveling agent such as General Electric's Type SF-69 silicone fluid. In our polymer/solvent mixtures, the polymer can constitute from about 5% to about 30% by weight; the solvent, from about 70% to about 95% by weight; and the leveling agent, from about 0.001% to about 0.01% by weight. As the ratio of solvent to polymer increases, the thickness of the membrane formed from such mixtures, in general, decreases.

Suitable release or parting agents for coating the rotatable surface in our method include Hunt Chemical Company's Superslix I. We can apply the release or parting agent to the rotatable surface by such conventional methods as spinning, dipping or brushing. Some release and some parting agents must also be cured at temperatures above room temperature to be effective.

Apparatus for making our new, thin, optical membranes includes means for dispensing a mixture of polymer and solvent onto a rotatable supporting surface; means for rotating the supporting surface at increasing velocities from a first speed to a final speed; and means for removing the film from the supporting surfaces as an edge-supported or coplanar-supported membrane.

The FIGURE accompanying this specification illustrates a preferred embodiment of this apparatus.

In FIG. 1, a polymer/solvent mixture in container 3 is pumped through check valves 1*a* and 1*b* by pump 5. Motor means/gear-drive linkage 4 drives the piston in pump 5. The polymer/solvent mixture passes through filter 6 and dispensing means 7 onto rotatable supporting surface 8.

Motor 12 spins chuck 9 and surface 8 in a controlled manner beginning at a predetermined velocity, and accelerating to a second, higher predetermined velocity, then holding that second velocity until the desired membrane forms. During rotation, splash guard/wind shroud means 10 minimizes the tendency of solvent and polymer to escape from the spinner bowl means 11. Drain means 14 provides an exit for unused polymer and solvent. Tachometer 13 is linked to motor 12 on one side and to a suitable servo system on the other side. The servo system initiates rotation of surface 8, and accelerates the velocity of rotation from the start, preferably linearly, at an acceleration in the range of about 50 rpm to about 500 rpm per second to a final velocity in the range of about 500 rpm to about 2,500 rpm.

Supporting surface 8 can be a round, square or rectangular, rigid or semi-rigid, optically-polished surface. Supporting surfaces made of metal, glass, and metal film on glass quartz are examples of suitable support surfaces. The surface quality of the support determines the quality of the membrane surface formed thereon.

What is claimed is:

1. A method for reliably and reproducibly making an optical membrane capable of being edge-supported, and capable of being removed, substantially intact, from the rotatable surface on which said membrane is formed, and having a predetermined thickness in the range of about 0.5 about 10 micrometers, with a precision of plus or minus about 2%, edge-to-edge variations in said thickness of less than about 2% over a distance of at least about 2.5 centimeters, and a capacity to transmit an average of at least about 91% of incident light with less than about 2% combined absorption and diffraction losses of said incident light over a span of wavelengths of incident light in the range of about 260 to about 1,000 nanometers, said method comprising dispensing a polymer/solvent mixture onto a rotatable supporting surface; spinning said rotatable surface under conditions sufficient to form said membrane from said polymer, said conditions being selected from the following: the viscosity of said polymer/solvent mixture, the rate of rotational acceleration of said rotatable supporting surface, and the final speed of rotation of said surface; and removing said optical membrane, after formation, from said rotatable surface.

2. A method for reliably and reproducibly making an optical membrane capable of being edge-supported, and capable of being removed, substantially intact, from the rotatable surface on which said membrane is formed, and having a precise, predetermined thickness in the range of about 0.5 to about 10 micrometers, the precision being plus or minus about 2%, edge-to-edge variations in said thickness of less than about 2% over a distance of at least about 2.5 centimeters, and a capacity to transmit an average of at least about 91% of incident light over a span of wavelengths of incident light where the span of wavelengths of said incident light is in the range of about 260 to 1,000 nanometers, said method comprising dispensing a polymer/solvent mixture onto a rotatable supporting surface; spinning said rotatable surface under conditions sufficient to form said membrane from said polymer, said conditions being selected from the following: the viscosity of said polymer/solvent mixture, the rate of rotational acceleration of said rotatable supporting surface, and the final speed of rotation of said surface; and removing said optical membrane, after formation, from said rotatable surface.

3. A method for reliably and reproducibly making an optical membrane capable of being edge-supported, and capable of being removed, substantially intact, from the rotatable surface on which said membrane is formed, and having a precise, predetermined thickness in the range of about 0.5 to about 10 micrometers, the precision being plus or minus about 2%, and a capacity to transmit an average of at least about 91% of incident light with less than about 3% combined absorption, diffraction and dispersion losses of said incident light where the wavelength span for the average transmission of incident light is in the range of about 260 to about 1,000 nanometers, said method comprising dispensing a polymer/solvent mixture onto a rotatable supporting surface; spinning said rotatable surface under conditions sufficient to form said membrane from said polymer, said conditions being selected from the following: the viscosity of said polymer/solvent mixture, the rate of rotational acceleration of said rotatable supporting surface, and the final speed of rotation of said surface; and removing said optical membrane, after formation, from said rotatable surface.

4. A method for reliably and reproducibly making an optical membrane capable of being edge-supported, and capable of being removed, substantially intact, from the rotatable surface on which said membrane is formed, and having a predetermined, precise thickness in the range of about 0.5 to about 10 micrometers, the precision being plus or minus about 2%, and the capacity to transmit an average of at least about 91% of incident light where the wavelengths of incident light range from about 260 to about 546 nanometers, said method comprising dispensing a polymer/solvent mixture onto a rotatable supporting surface; spinning said rotatable surface under conditions sufficient to form said membrane from said polymer, said conditions being selected from the following: the viscosity of said polymer/solvent mixture, the rate of rotational acceleration of said rotatable supporting surface, and the final speed of rotation of said surface; and removing said optical membrane, after formation, from said rotatable surface.

5. A method for reliably and reproducibly making an optical membrane capable of being edge-supported, and capable of being removed, substantially intact, from the rotatable surface on which said membrane is formed, and having a predetermined, precise thickness in the range of about 0.5 to about 10 micrometers, the precision being plus or minus about 2%, edge-to-edge variations in said thickness of less than about 2% over a distance of at least 2.5 centimeters, and the capacity to transmit about 99% of incident light at at least one predetermined wavelength of incident light in the range of about 260 to about 1,000 nanometers, said method comprising dispensing a polymer/solvent mixture onto a rotatable supporting surface; spinning said rotatable surface under conditions sufficient to form said membrane from said polymer, said conditions being selected from the following: the viscosity of said polymer/solvent mixture, the rate of rotational acceleration of said rotatable supporting surface, and the final speed of rotation of said surface; and removing said optical membrane, after formation, from said rotatable surface.

6. A method for reliably and reproducibly making an optical membrane capable of being edge-supported, and capable of being removed, substantially intact, from the rotatable surface on which said membrane is formed, and having a precise, predetermined thickness in the range of about 0.5 to about 10 micrometers with a precision of plus or minus about 2%, edge-to-edge variations in said thickness of less than about 2% over a distance of at least 2.5 centimeters, and the capacity to transmit about 99% of incident light at at least one predetermined wavelength of incident light in the range of about 260 to about 546 nanometers, said method comprising dispensing a polymer/solvent mixture onto a rotatable supporting surface; spinning said rotatable surface under conditions sufficient to form said membrane from said polymer, said conditions being selected from the following: the viscosity of said polymer/solvent mixture, the rate of rotational acceleration of said rotatable supporting surface, and the final speed of rotation of said surface; and removing said optical membrane, after formation, from said rotatable surface.

7. A method for reliably and reproducibly making an optical membrane capable of being edge-supported, and capable of being removed, substantially intact, from the rotatable surface on which said membrane is formed, and having a predetermined, precise thickness in the range of about 0.5 to about 10 micrometers, the precision being plus or minus about 2%, edge-to-edge variations in said thickness of less than about 2% over a distance of at least about 2.5 centimeters, said membrane being a pellicle with a capacity to transmit an average of at least about 91% of incident light where the incident light wavelengths range from about 260 nanometers to about 450 nanometers, said method comprising dispensing a polymer/solvent mixture onto a rotatable supporting surface; spinning said rotatable surface under conditions sufficient to form said membrane from said polymer, said conditions being selected from the following: the viscosity of said polymer/solvent mixture, the rate of rotational acceleration of said rotatable supporting surface, and the final speed of rotation of said surface; and removing said optical membrane, after formation, from said rotatable surface.

8. A method for reliably and reproducibly making an optical membrane capable of being edge-supported, and capable of being removed, substantially intact, from the rotatable surface on which said membrane is formed, and having a predetermined thickness in the range of about 0.5 to about 10 micrometers, with a precision of plus or minus about 2%, and a capacity to transmit an average of at least about 91% of incident light over a span of wavelengths of incident light in the range of about 260 to about 1,000 nanometers, said method comprising dispensing a polymer/solvent mixture onto a rotatable supporting surface; spinning said rotatable surface under conditions sufficient to form said membrane from said polymer, said conditions being selected from the following: the viscosity of said polymer/solvent mixture, the rate of rotational acceleration of said rotatable supporting surface, and the final speed of rotation of said surface; and removing said optical membrane, after formation, from said rotatable surface.

9. A method for reliably and reproducibly making an optical membrane capable of being edge-supported, and capable of being removed, substantially intact, from the rotatable surface on which said membrane is formed and having a precise, predetermined thickness in the range of about 0.5 to about 10 micrometers, the precision being plus or minus about 5%, and a capacity to transmit an average of at least about 91% of incident light over a span of wavelengths of said incident light in the range of about 260 to about 1,000 nanometers, said method comprising dispensing a polymer/solvent mixture onto a rotatable supporting surface; spinning said rotatable surface under conditions sufficient to form said membrane from said polymer, said conditions being selected from the following: the viscosity of said polymer/solvent mixture, the rate of rotational acceleration of said rotatable supporting surface, and the final speed of rotation of said surface; and removing said optical membrane, after formation, from said rotatable surface.

10. A method for reliably and reproducibly making an optical membrane capable of being edge-supported, and capable of being removed, substantially intact, from the rotatable surface on which said membrane is formed, and having a predetermined, precise thickness in the range of about 0.5 to about 10 micrometers, and the capacity to transmit an average of at least about 91% of incident light where the wavelengths of incident light range from about 300 to about 546 nanometers, said method comprising dispensing a polymer/solvent mixture onto a rotatable supporting surface; spinning said rotatable surface under conditions sufficient to form said membrane from said polymer, said conditions being selected from the following: the viscosity of said polymer/solvent mixture, the rate of rotational acceleration of said rotatable supporting surface, and the final speed of rotation on said surface; and removing said optical membrane, after formation, from said rotatable surface.

11. A method for reliably and reproducibly making an optical membrane capable of being edge-supported, and capable of being removed, substantially intact, from the rotatable surface on which said membrane is formed, and having a predetermined, precise thickness in the range of about 0.5 to about 10 micrometers, the precision being plus or minus about 2%, and the capacity to transmit about 99% of incident light at at least one predetermined wavelength of incident light in the range of about 260 to about 1,000 nanometers, said method being comprising dispensing a polymer/solvent mixture onto a rotatable supporting surface; spinning said rotatable surface under conditions sufficient to form said membrane from said polymer, said conditions being selected from the following: the viscosity of said polymer/solvent mixture, the rate of rotatational acceleration of said rotatable supporting surface, and the final speed of rotation of said surface; and removing said optical membrane, after formation, from said rotatable surface.

12. A method for reliably and reproducibly making an optical membrane capable of being edge-supported, and capable of being removed, substantially intact, from the rotatable surface on which said membrane is formed, and having a precise, predetermined thickness in the range of about 0.5 to about 10 micrometers with a precision of plus or minus about 2%, and the capacity to transmit about 99% of incident light at at least one predetermined wavelength of incident light in the range of about 260 to about 546 nanometers, said method comprising dispening a polymer/solvent mixture onto a rotatable supporting surface, and spinning said rotatable surface under conditions sufficient to form said membrane from said polymer, said conditions being selected from the following: the viscosity of said polymer/solvent mixture, the rate of rotational acceleration of said rotatable supporting surface, and the final speed of rotation of said surface; and removing said optical membrane, after formation, from said rotatable surface.

13. A method for reliably and reproducibly making an optical membrane capable of being edge-supported, and capable of being removed, substantially intact, from the rotatable surface on which said membrane is formed, and having a predetermined, precise thickness in the range of about 0.5 to about 10 micrometers, the precision being plus or minus about 2%, said membrane being a pellicle with a capacity to transmit an average of at least about 91% of incident light where the incident light wavelengths range from about 300 nanometers to about 450 nanometers, said method comprising dispensing a polymer/solvent mixture onto a rotatable supporting surface; spinning said rotatable surface under conditions sufficient to form said membrane from said polymer, said conditions being selected from the following: the viscosity of said polymer/solvent mixture, the rate of rotational acceleration of said rotatable supporting surface, and the final speed of rotation of said surface; and removing said optical membrane, after formation, from said rotatable surface.

14. A method for reliably and reproducibly making an optical membrane capable of being edge-supported, and capable of being removed, substantially intact, from the rotatable surface on which said membrane is formed, and having a predetermined thickness in the range of about 0.5 to about 10 micrometers, with a precision of plus or minus about 2%, and a capacity to transmit an average of at least about 91% of incident light with less than about 2% combined absorption and diffraction losses of said incident light in the range of about 350 to about 546 nanometers, said method comprising dispensing a polymer/solvent mixture onto a rotatable supporting surface; spinning said rotatable surface under conditions sufficient to form said membrane from said polymer, said conditions being selected from the following: the viscosity of said polymer/solvent mixture, the rate of rotational acceleration of said rotatable supporting surface, and the final speed of rotation of said surface; and removing said optical membrane, after formation, from said rotatable surface.

15. A method for reliably and reproducibly making an optical membrane capable of being edge-supported, and capable of being removed, substantially intact, from the rotatable surface on which said membrane is formed, and having a precise, predetermined thickness in the range of about 0.5 to about 10 micrometers, the precision being plus or minus about 5%, and a capacity to transmit an average of at least about 91% of incident light over a span of wavelengths of said incident light is in the range of about 350 to about 546 nanometers, said method comprising dispensing a polymer/solvent mixture onto a rotatable supporting surface; spinning said rotatable surface under conditions sufficient to form said membrane from said polymer, said conditions being selected from the following: the viscosity of said polymer/solvent mixture, the rate of rotational acceleration of said rotatable supporting surface, and the final speed of rotation of said surface; and removing said optical membrane, after formation, from said rotatable surface.

16. A method for reliably and reproducibly making an optical membrane capable of being edge-supported, and capable of being removed, substantially intact, from the rotatable surface on which said membrane is formed, and having a precise, predetermined thickness in the range of about 0.5 to about 10 micrometers, the precision being plus or minus about 2%, and a capacity to transmit an average of at least about 91% of incident light with less than about 3% combined absorption, diffraction and dispersion losses of said incident light where the wavelength span for the average transmission of incident light is in the range of about 350 to about 546 nanometers, said method comprising dispensing a polymer/solvent mixture onto a rotatable supporting surface; spinning said rotatable surface under conditions sufficient to form said membrane from said polymer, said conditions being selected from the following: the viscosity of said polymer/solvent mixture, the rate of rotational acceleration of said rotatable supporting surface, and the final speed of rotation of said surface; and removing said optical membrane, after formation, from said rotatable surface.

17. A method for reliably and reproducibly making an optial membrane capable of being edge-supported, and capable of being removed, substantially intact, from the rotatable surface on which said membrane is formed, and having a precise, predetermined thickness in the range of about 0.5 to about 10 micrometers, and the capacity to transmit about 99% of incident light at at least one predetermined wavelength of incident light in the range of about 260 to about 546 nanometers, said method comprising dispensing a polymer/solvent mixture onto a rotatable supporting surface; spinning said rotatable surface under conditions sufficient to form said membrane from said polymer, said conditions being selected from the following: the viscosity of said polymer/solvent mixture, the rate of rotational acceleration of said rotatable supporting surface, and the final speed of rotation of said surface; and removing said optical membrane, after formation, from said rotatable surface.

18. A method for reliably and reproducibly making an optical membrane capable of being edge-supported, and capable of being removed, substantially intact, from the rotatable surface on which said membrane is formed, and having a precise, predetermined thickness in the range of about 0.5 to about 10 micrometers, edge-to-edge variations in said thickness of less than about 2% over a distance of at least about 2.5 centimers, and a capacity to transmit an average of at least about 91% of incident light over a span of wavelengths of incident light where the span of wavelengths of said incident light is in the range of about 350 nanometers to about 546 nanometers, said method comprising dispensing a polymer/solvent mixture onto a rotatable supporting surface; spinning said rotatable surface under conditions sufficient to form said membrane from said polymer, said conditions being selected from the following: the viscosity of said polymer/solvent mixture, the rate of rotational acceleration of said rotatable supporting surface, and the final speed of rotation of said surface; and removing said optical membrane, after formation, from said rotatable surface.

19. A method for reliably and reproducibly making an optical membrane capable of being supported at its periphery, and capable of being removed, substantially intact, from the rotatable surface on which said membrane is formed, and having a predetermined thickness in the range of about 0.5 about 10 micrometers, and the capacity to transmit an average of at least about 91% of incident light where the wavelengths of incident light range from about 330 to about 546 nanometers, said method comprising dispensing a polymer/solvent mixture onto a rotatable supporting surface; spinning said rotatable surface under conditions sufficient to form said membrane from said polymer, said conditions being selected from the following: the viscosity of said polymer/solvent mixture, the rate of rotational acceleration of said rotatable supporting surface, and the final speed of rotation on said surface; and removing said optical membrane, after formation, from said rotatable surface.

20. A method for reliably and reproducibly making an optical membrane capable of being supported at its periphery, and capable of being removed, substantially intact, from the rotatable surface on which said membrane is formed, and having a predetermined thickness in the range of about 0.5 about 10 micrometers, edge-to-edge variations in said thickness in the range of plus or minus about 5% over a distance of at least 2.5 centimeters, and the capacity to transmit an average of at least about 91% of incident light where the wavelengths of incident light range from about 330 to about 546 nanometers, said method comprising dispensing a polymer/-solvent mixture onto a rotatable supporting surface; spinning said rotatable surface under conditions sufficient to form said membrane from said polymer, said conditions being selected from the following: the viscosity of said polymer/solvent mixture, the rate of rotational acceleration of said rotatable supporting surface, and the final speed of rotation on said surface; and removing said optical membrane, after formation, from said rotatable surface.

21. A method for reliably and reproducibly making an optical membrane capable of being supported at its periphery, and capable of being removed, substantially intact, from the rotatable surface on which said membrane is formed, and having a predetermined thickness in the range of about 0.5 about 10 micrometers, edge-to-edge variations in said thickness in the range of plus or minus about 4% over a distance of at least 2.5 centimeters, and the capacity to transmit an average of at least about 91% of incident light where the wavelengths of incident light range from about 330 to about 546 nanometers, said method comprising dispensing a polymer/-solvent mixture onto a rotatable supporting surface; spinning said rotatable surface under conditions sufficient to form said membrane from said polymer, said conditions being selected from the following: the viscosity of said polymer/solvent mixture, the rate of rotational acceleration of said rotatable supporting surface, and the final speed of rotation on said surface; and removing said optical membrane, after formation, from said rotatable surface.

22. A method for reliably and reproducibly making an optical membrane capable of being supported at its periphery, and capable of being removed, substantially intact, from the rotatable surface on which said membrane is formed, and having a predetermined thickness in the range of about 0.5 about 10 micrometers, edge-to-edge variations in said thickness in the range of plus or minus about 3% over a distance of at least 2.5 centimeters, and the capacity to transmit an average of at least about 91% of incident light where the wavelengths of incident light range from about 330 to about 546 nanometers, said method comprising dispensing a polymer/-solvent mixture onto a rotatable supporting surface; spinning said rotatable surface under conditions sufficient to form said members from said polymer, said conditions being selected from the following: the viscosity of said polymer/solvent mixture, the rate of rotational acceleration of said rotatable supporting surface, and the final speed of rotation on said surface; and removing said optical membrane, after formation, from said rotatable surface.

23. A method for reliably and reproducibly making an optical membrane capable of being supported at its periphery, and capable of being removed, substantially intact, from the rotatable surface on which said membrane is formed, and having a predetermined thickness in the range of about 0.5 about 10 micrometers, edge-to-edge variations in said thickness in the range of plus or minus about 2% over a distance of at least 2.5 centimeters, and the capacity to transmit an average of at least about 91% of incident light where the wavelengths of incident light range from about 330 to about 546 nanometers, said method comprising dispensing a polymer/solvent mixture onto a rotatable supporting surface; spinning said rotatable surface under conditions sufficient to form said membrane from said polymer, said conditions being selected from the following: the viscosity of said polymer/solvent mixture, the rate of rotational acceleration of said rotatable supporting surface, and the final speed of rotation on said surface; and removing said optical membrane, after formation, from said rotatable surface.

24. A method for reliably and reproducibly making an optical membrane capable of being supported at its periphery, and capable of being removed, substantially intact, from the rotatable surface on which said membrane is formed, and having a predetermined thickness in the range of about 0.5 about 10 micrometers, and the capacity to transmit an average of at least about 91% of incident light where the wavelengths of incident light range from about 250 to about 546 nanometers, said method comprising dispensing a polymer/solvent mixture onto a rotatable supporting surface; spinning said rotatable surface under conditions sufficient to form said membrane from said polymer, said conditions being selected from the following: the viscosity of said polymer/solvent mixture, the rate of rotational acceleration of said rotatable supporting surface, and the final speed of rotation on said surface; and removing said optical membrane, after formation, from said rotatable surface.

25. A method for reliably and reproducibly making an optical membrane capable of being supported at its periphery, and capable of being removed, substantially intact, from the rotatable surface on which said membrane is formed, and having a predetermined thickness in the range of about 0.5 about 10 micrometers, edge-to-edge variations in said thickness in the range of plus or minus about 5% over a distance of at least 2.5 centimeters, and the capacity to transmit an average of at least about 91% of incident light where the wavelengths of incident light range from about 250 to about 546 nanometers, said method comprising dispensing a polymer/solvent mixture onto a rotatable supporting surface; spinning said rotatable surface under conditions sufficient to form said membrane from said polymer, said conditions being selected from the following: the viscosity of said polymer/solvent mixture, the rate of rotational acceleration of said rotatable supporting surface, and the final speed of rotation on said surface; and removing said optical membrane, after formation, from said rotatable surface.

26. A method for reliably and reproducibly making an optical membrane capable of being supported at its periphery, and capable of being removed, substantially intact, from the rotatable surface on which said membrane is formed, and having a predetermined thickness in the range of about 0.5 about 10 micrometers, edge-to-edge variations in said thickness in the range of plus or minus about 4% over a distance of at least 2.5 centimeters, and the capacity to transmit an average of at least about 91% of incident light where the wavelengths of incident light range from about 250 to about 546 nanometers, said method comprising dispensing a polymer/solvent mixture onto a rotatable supporting surface; spinning said rotatable surface under conditions sufficient to form said membrane from said polymer, said conditions being selected from the following: the viscosity of said polymer/solvent mixture, the rate of rotational acceleration of said rotatable supporting surface, and the final speed of rotation on said surface; and removing said optical membrane, after formation, from said rotatable surface.

27. A method for reliably and reproducibly making an optical membrane capable of being supported at its periphery, and capable of being removed, substantially intact, from the rotatable surface on which said membrane is formed, and having a predetermined thickness in the range of about 0.5 about 10 micrometers, edge-to-edge variations in said thickness in the range of plus or minus about 3% over a distance of at least 2.5 centimeters, and the capacity to transmit an average of at least about 91% of incident light where the wavelengths of incident light range from about 250 to about 546 nanometers, said method comprising dispensing a polymer/solvent mixture onto a rotatable supporting surface; spinning said rotatable surface under conditions sufficient to form said membrane from said polymer, said conditions being selected from the following: the viscosity of said polymer/solvent mixture, the rate of rotational acceleration of said rotatable supporting surface, and the final speed of rotation on said surface; and removing said optical membrane, after formation, from said rotatable surface.

28. A method for reliably and reproducibly making an optical membrane capable of being supported at its periphery, and capable of being removed, substantially intact, from the rotatable surface on which said membrane is formed, and having a predetermined thickness in the range of about 0.5 about 10 micrometers, edge-to-edge variations in said thickness in the range of plus or minus about 2% over a distance of at least 2.5 centimeters, and the capacity to transmit an average of at least about 91% of incident light where the wavelengths of incident light range from about 250 to about 546 nanometers, said method comprising dispensing a polymer/solvent mixture onto a rotatable supporting surface; spinning said rotatable surface under conditions sufficient to form said membrane from said polymer, said conditions being selected from the following: the viscosity of said polymer/solvent mixture, the rate of rotational acceleration of said rotatable supporting surface, and the final speed of rotation on said surface; and removing said optical membrane, after formation, from said rotatable surface.

29. The method of claim 1 or claim 2 or claim 3 or claim 4 or claim 5 or claim 6 or claim 7 or claim 8 or claim 9 or claim 10 or claim 11 or claim 12 or claim 13 or claim 14 or claim 15 or claim 16 or claim 17 or claim 18 further comprising removing said membrane from said rotatable supporting surface, and attaching said membrane to means for providing edge support to said membrane.

30. The method of claim 1 or claim 2 or claim 3 or claim 4 or claim 5 or claim 6 or claim 7 or claim 8 or claim 9 or claim 10 or claim 11 or claim 12 or claim 13 or claim 14 or claim 15 or claim 16 or claim 17 or claim 18 further comprising attaching said membrane to means for providing edge support only to said membrane and removing said membrane from said rotatable supporting surface.

31. The method of claim 1 or claim 2 or claim 3 or claim 4 or claim 5 or claim 6 or claim 7 or claim 8 or claim 9 or claim 10 or claim 11 or claim 12 or claim 13 or claim 14 or claim 15 or claim 16 or claim 17 or claim 18 or claim 19 or claim 20 or claim 21 or claim 22 or claim 23 or claim 24 or claim 25 or claim 26 or claim 27 or claim 28 further comprising attaching said membrane to means for providing edge support to said membrane, and thereafter removing said membrane from said rotatable supporting surface.

32. The method of claim 1 or claim 2 or claim 3 or claim 4 or claim 5 or claim 6 or claim 7 or claim 8 or claim 9 or claim 10 or claim 11 or claim 12 or claim 13 or claim 14 or claim 15 or claim 16 or claim 17 or claim 18 or claim 19 or claim 20 or claim 21 or claim 22 or claim 23 or claim 24 or claim 25 or claim 26 or claim 27 or claim 28 wherein said membrane is a pellicle, further comprising removing said pellicle from said rotatable supporting surface, and thereafter attaching said pellicle to means for providing edge support to said pellicle.

33. The method of claim 1 or claim 2 or claim 3 or claim 4 or claim 5 or claim 6 or claim 7 or claim 8 or claim 9 or claim 10 or claim 11 or claim 12 or claim 13 or claim 14 or claim 15 or claim 16 or claim 17 or claim 18 or claim 19 or claim 20 or claim 21 or claim 22 or claim 23 or claim 24 or claim 25 or claim 26 or claim 27 or claim 28 wherein said membrane is a pellicle, further comprising attaching said pellicle to means for providing edge support to said pellicle, and thereafter removing said pellicle from said rotatable supporting surface.

* * * * *